United States Patent [19]

Lindbeck

[11] Patent Number: 4,560,009

[45] Date of Patent: Dec. 24, 1985

[54] APPARATUS FOR PULVERIZING AGGREGATE MASSES OF FRANGIBLE MATERIALS ON AND BELOW EARTH SURFACES

[76] Inventor: Lester R. Lindbeck, 19194 Ave. 22½, Chowchilla, Calif. 93610

[21] Appl. No.: 608,766

[22] Filed: May 10, 1984

[51] Int. Cl.[4] .................. A01B 33/02; A01B 35/18
[52] U.S. Cl. ................................ 172/66; 172/32; 172/112
[58] Field of Search .............. 172/66, 67, 112, 65, 172/32, 123

[56] References Cited

U.S. PATENT DOCUMENTS

| 1,197,926 | 9/1916 | Goodson | 172/112 |
|---|---|---|---|
| 1,813,651 | 7/1931 | Young | 172/67 |
| 2,368,331 | 1/1945 | Seaman | 172/66 |
| 2,539,136 | 1/1951 | Hite | 172/65 |
| 3,348,619 | 10/1967 | Reynolds | 172/66 |
| 3,409,088 | 11/1968 | Lindbeck | 172/66 |
| 3,998,276 | 12/1976 | MacMillan | 172/112 |
| 4,005,755 | 2/1977 | Bakke | 172/112 |

FOREIGN PATENT DOCUMENTS 827999  2/1960  United Kingdom ............... 172/67

Primary Examiner—Richard J. Johnson
Attorney, Agent, or Firm—Worrel & Worrel

[57] ABSTRACT

An improved apparatus for pulverizing aggregate masses of frangible materials deposited on and below earth surfaces, the apparatus having a frame; a power driven, substantially cylindrical rotor mounted on the frame and providing a plurality of radially extended teeth about its periphery; a mounting assembly attached on the frame and adapted to be connected rearwardly on a prime mover for forward earth traversing movement of the apparatus in towed relation thereto, the mounting assembly being selectively operable to elevate and lower the frame relative to an earth surface; and a porous grid hingedly mounted on the frame, the grid providing an anvil portion adapted operatively to be disposed below the rotor obliquely relative to the path of travel of the apparatus to urge materials engaged by the anvil portion into impacting engagement with the rotor periphery.

19 Claims, 6 Drawing Figures

APPARATUS FOR PULVERIZING AGGREGATE MASSES OF FRANGIBLE MATERIALS ON AND BELOW EARTH SURFACES

BACKGROUND OF THE INVENTION

1. Field of the Invention

The present invention relates to an apparatus for pulverizing aggregate masses of frangible materials such as compacted soil, hardpan, rocks and the like, and more particularly to such an apparatus which provides an earth pulverizing rotor assembly mounted on a frame adapted to be carried by a tractor or the like for earth traversing movement and having a grid providing a strike plate or anvil portion adapted to be brought into engagement with the frangible materials to urge the materials into engagement with the rotor to impact the frangible materials against the strike plate portion whereby the masses of materials are fragmented.

2. Description of the Prior Art

It has long been known that many types of soils have a tendency to compact and form hardpan over the course of time when exposed to vehicular traffic and repeated applications of moisture, such as rain or water used for irrigation. Consequently, in order that such soils once compacted may be used for agricultural purposes, it is often necessary to fragment the substantially cohesive mass of the soil and to reduce the size of the resultant fragmented aggregate masses sufficiently to permit the cultivation and agricultural use of the soil.

It has also long been known that many earth surface areas have little inherent utility for agricultural purposes, due to the presence of rocks and other debris strewn thereon or incorporated therein. While some of such materials deposited on the surface of a given area may be removed therefrom by raking or the like, the removal of rocks and other aggregate masses from subsurface soils has long been known to be a time-consuming, laborious and generally ineffective task employing conventional apparatuses and implements.

A number of apparatuses have been proposed for purposes of pulverizing large fragments of hardpan soil, rocks, and other cohesive or aggregate masses, such as asphaltic roadway sections, deposited on or below earth surfaces. One such apparatus is that disclosed in my prior U.S. Pat. No. 3,409,088, directed to an apparatus for scarifying and pulverizing compacted soil and the like. My prior apparatus provided a power-driven cultivating rotor having a plurality of spaced, radially-extended teeth inclined forwardly in relation to the direction of rotor rotation and a shroud having an arcuate, reticulate, particle-size control grid mounted in the shroud with the grid formed on a radius greater than the rotor to form a crescent-shaped hammer mill area between the grid and the rotor to force material fragments too large to pass through the grid into the spaces between the teeth for transport over the rotor and to cause their gravitational and centrifugal discharge ahead of the rotor for further engagement by the teeth until sufficiently reduced in size to pass through the grid. The shroud and rotor were carried on a mobile frame mounted for earth traversing movement. In operation, large masses of aggregate soil previously ripped by a ripper carried on the frame, pass between the transversely spaced ripper teeth and are contacted by the teeth of the rotor whereby they are accelerated rearwardly to be discharged from the rotor teeth to impinge against the grid. The shroud and grid were carried substantially entirely rearwardly of the periphery of the rotor with the lowermost portions of the shroud and grid carried in trailing relation to the lowermost portion of the rotor periphery. Therefore, effective pulverizing of aggregate masses was largely dependent upon such masses first being dug from the soil by the rotor and thrown backward toward the grid.

While my prior apparatus was effective in a number of environments, it was found in practice that the apparatus had to be moved forwardly at a relatively slow pace during earth traversing movement deployed in an operative attitude to permit aggregate masses carried by the rotor into the hammer mill area to be repeatedly impacted by the rotor teeth and thrown against the grid. It was found that effective cultivation of earth surfaces having large quantities of very hard aggregate masses, such as rocks and broken hardpan, was only made possible by making multiple passes along a selected path to effect a degree of substantially homogeneous pulverizing sufficient to render the earth so pulverized suitable for agricultural purposes or earth grading.

Further, it was found that the crescent-shaped hammer mill area defined by the periphery of the rotor and the arcuate grid did not permit the optimum utilization of the pulverizing effect of the apparatus in a variety of soil environments. Moreover, it was discovered that compensation for wear of the rotor teeth was not generally effectively compensated for by adjustment of the arcuate grid, thus necessitating frequent rebuilding of the outermost portions of the teeth as they became worn down.

Therefore, it has long been known that it would be desirable to have an apparatus for pulverizing compacted soil and other aggregate cohesive masses of frangible materials, such as rock or asphalt, deposited on or below earth surfaces which is capable of pulverizing even the hardest of such compacted masses with an efficiency and a resulting homogeneity of pulverized material heretofore unattainable employing conventional implements. Further, it has long been known that it would be desirable to have such an implement which is capable of cultivating soil and the like at a variety of depths and which is adjustable to permit adaptation thereof for use in a variety of work environments. Moreover, it has also long been known that it would be desirable to have such an apparatus which is adapted to be constructed of sufficiently compact dimensions to permit the operation thereof in the cultivation of soils in vineyards, orchards, and other agricultural environments wherein preexisting plant growth defines substantially confined and narrow available paths of travel.

OBJECTS AND SUMMARY OF THE INVENTION

Therefore, it is an object of the present invention to provide an improved apparatus for pulverizing compacted and hardpan soils and other frangible materials, such as rocks and asphalt deposited on and below earth surfaces.

Another object is to provide such an apparatus which is adjustable to permit the use thereof in pulverizing materials buried in soil at varying depths.

Another object is to provide such an apparatus which provides a portion which initially engages and fractures large chunks of frangible materials prior to the pulverizing thereof.

Another object is to provide such an apparatus which is capable of pulverizing even the hardest of frangible materials with an efficiency and rate of operation heretofore unattainable.

Another object is to provice such an apparatus which is capable of substantially compact construction for use thereof in pulverizing soils in confined environments such as vineyards and orchards without damage to preexisting cultivated, vegetative growth.

Another object is to provide such an apparatus which is of such exceedingly durable construction as virtually to preclude damage thereto over a long operational life.

Another object is to provide such an apparatus which is easily adjustable in a work environment to permit accommodation of varying environmental work conditions.

Further objects and advantages are to provide improved elements and arrangements thereof in an apparatus for the purposes described which is dependable, economical, durable and fully effective in accomplishing its intended purposes.

DESCRIPTION OF THE PREFERRED EMBODIMENT

Figure 1:
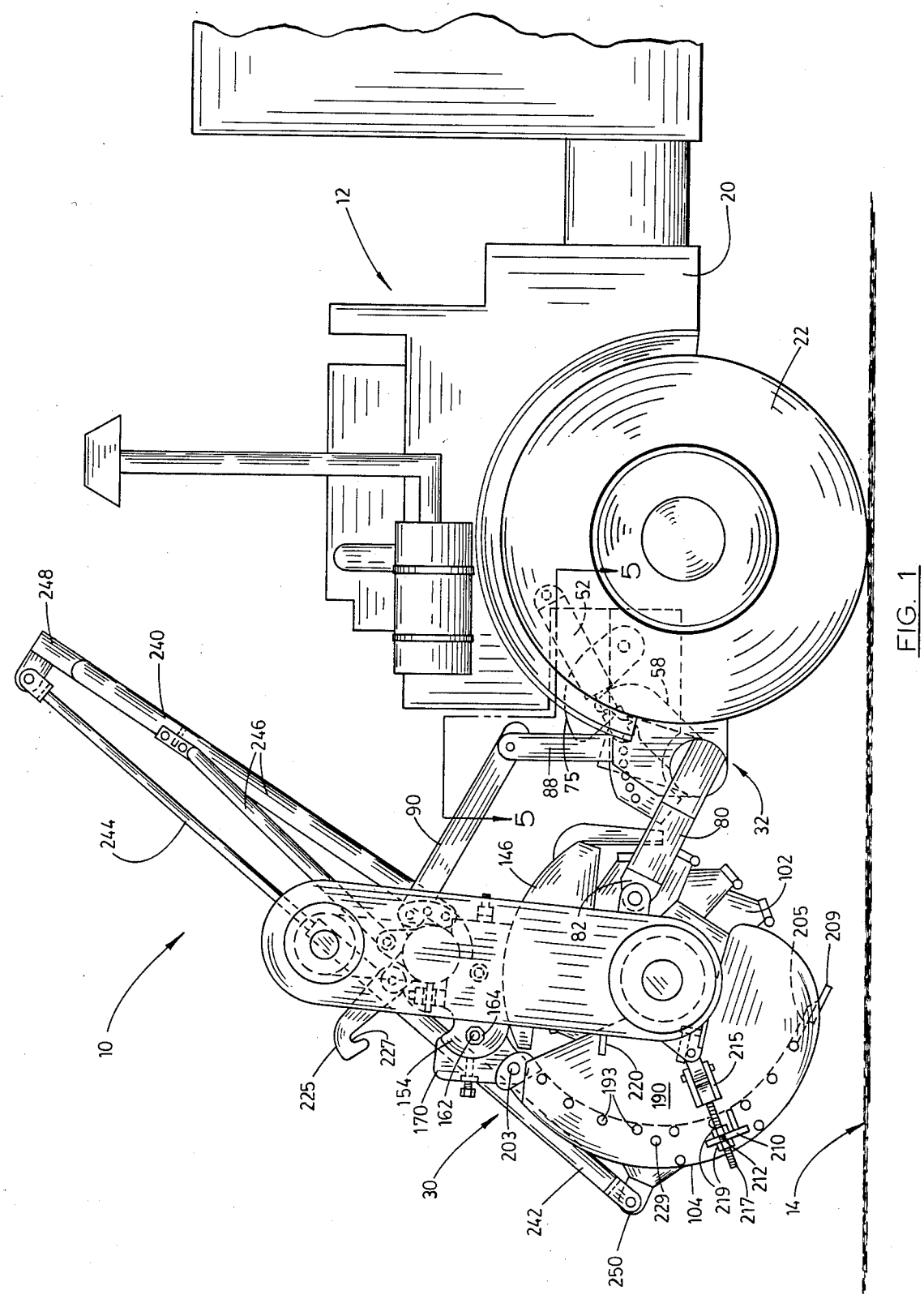
FIG. 1 is a side elevation of an apparatus embodying the principles of the present invention shown in a typical operational environment mounted on a schematically depicted conventional prime mover portion.

Referring more particularly to the drawings, the apparatus embodying the principles of the present invention is designated generally by the numeral 10 in FIGS. 1 through 4. As shown therein, and as can best be seen in FIGS. 1, 3, and 4, the apparatus is displayed in a typical operational environment mounted rearwardly on a prime mover portion or tractor 12 for towing by the tractor for earth traversing movement thereof forwardly along selected paths of travel over an earth surface 14. As can best be seen in FIG. 3, the earth surface 14 has aggregate masses 16 of frangible materials, such as hardpan soil, rocks, asphalt or the like, deposited on or below it to varying depths.

The tractor 12 can be of virtually any conventional design having a sturdy construction capable of traversing earth surfaces along selected paths and, accordingly, it is depicted schematically and fragmentarily in FIGS. 1, 3, 4 and 5. As shown therein, the tractor has a chassis or body 20 supported on wheels 22 mounted for driven rotation by an engine and power train (not shown) of conventional design operable to propel the tractor along a selected path of travel.

The apparatus generally provides a cultivating or implement portion 30 and a support or mounting assembly 32 mounted on the implement portion 30 and adapted to be secured on the tractor 12 in supporting relation to the implement portion.

Figure 3:
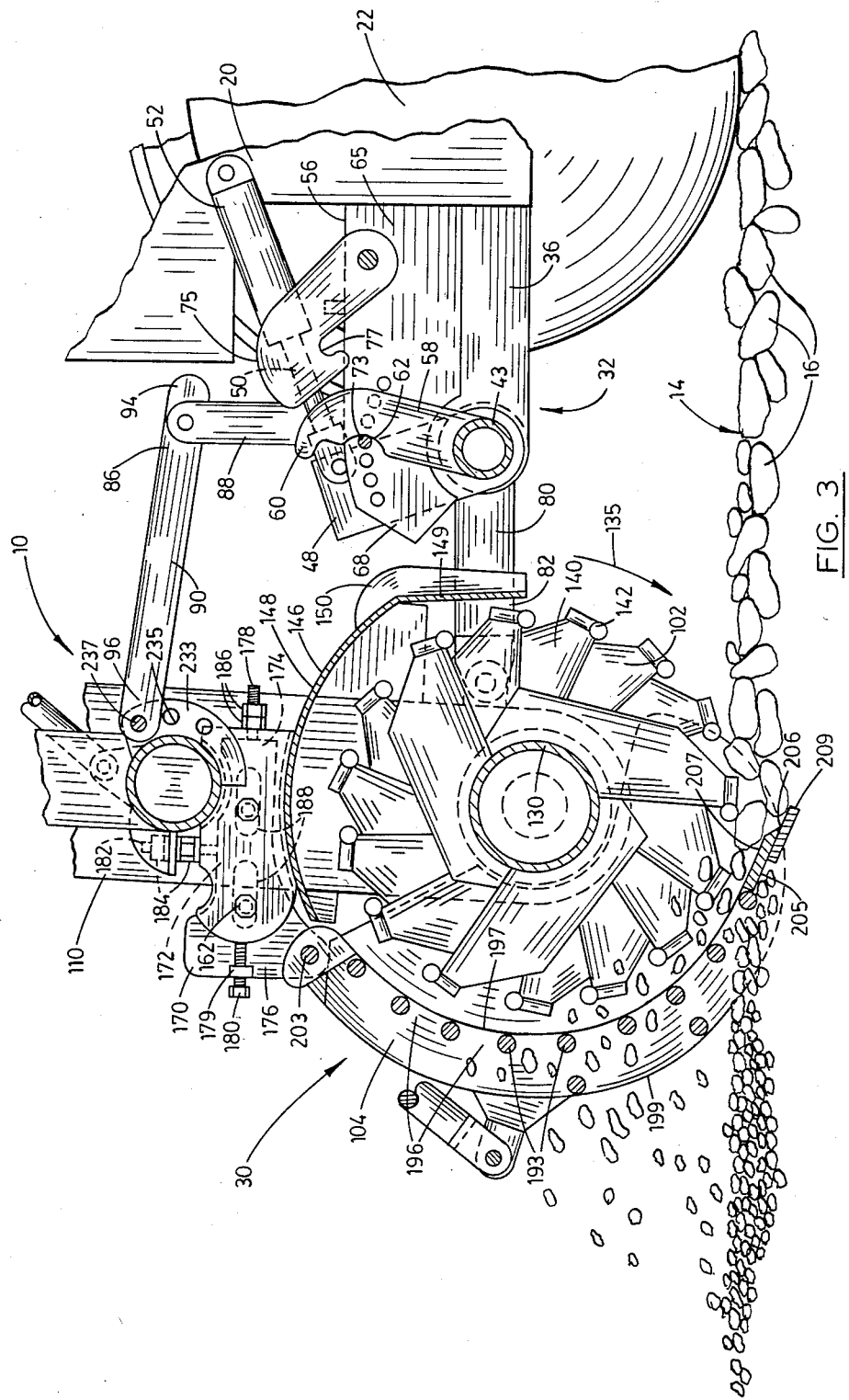
FIG. 3 is a somewhat enlarged section taken on line 3—3 in FIG. 2 with portions of the apparatus removed for purposes of illustration.
Figure 5:
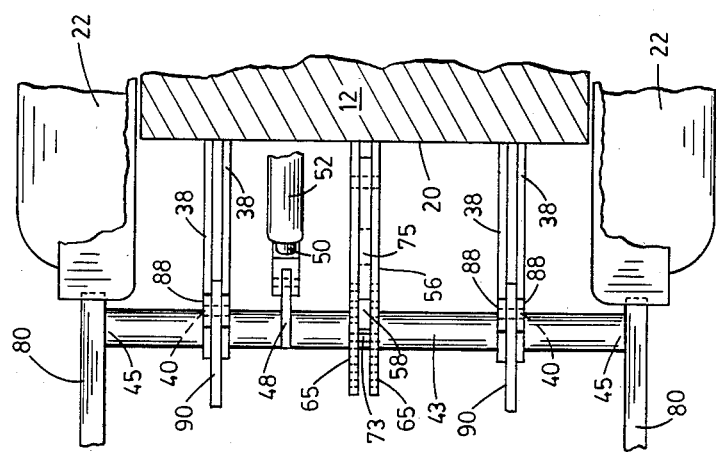
FIG. 5 is a top plan view of the apparatus taken on line 5—5 in FIG. 1.

As can best be seen in FIGS. 3 and 5, the mounting assembly 32 provides a pair of axle support brackets 36 mounted on the body 20 as by welding or the like and spaced transversely of each other on the tractor body. Each bracket provides a pair of substantially flat plates 38 constructed of steel or other suitable rigid material and projecting rearwardly from the tractor body in substantially parallel spaced relation. The plates 38 each provide an aperture 40 of substantially circular configuration, and the apertures are aligned concentrically along a predetermined axis.

A mounting shaft or axle 43 is received through the apertures 40 of the plates 38 for pivotal movement about a pivotal axis substantially coaxial with the axis along which the apertures are aligned. The mounting axle provides opposite end portions 45 spaced longitudinally thereof a predetermined length.

The mounting axle 43 mounts a pivot lever 48 rigidly secured thereto as by welding or the like and constructed of steel plate or other suitable material. The piston or ram portion 50 of a hydraulic cylinder 52 of conventional design is pivotally secured on the pivot lever 48. The hydraulic cylinder, shown fragmentarily, is mounted on the tractor 12 and is operable in a conventional fashion to extend or retract the ram portion by means of the selective pressurized flow of hydraulic fluid through supply and return lines (not shown) in a conventional hydraulic system carried on the tractor. Extension of the ram portion effects a pivotal movement of the pivot lever 48 away from the tractor, with a consequent pivoting of the mounting axle, as can be seen by reference to FIG. 3. Conversely, retraction of the ram portion draws the pivot lever toward the tractor.

The mounting assembly 32 further provides means for restraining or limiting the range of pivotal movement of the pivot lever 48 away from the body 20 of the tractor 12 in the form of a depth gauge assembly 56, the function of which is described more fully hereafter. The depth gauge assembly 56 provides an elongated adjustment lever 58 rigidly constructed of steel plate or other suitable material projecting radially from the mounting axle 43 and secured thereto as by welding or the like. The adjustment lever provides a bossed or male end portion 60 distally of the mounting axle 43. A notch 62 is defined by the portion of the adjustment lever 58 remote from the tractor 12.

A pair of elongated, substantially flat plates 65 are adapted to be secured as by welding or the like spaced transversely from each other on the body 20 of the tractor 12. The plates each provide a distal end portion 68 providing a plurality of holes 70 substantially radially equidistantly spaced from the mounting axle 43. Each hole is aligned with, and paired with, a corresponding hole of the opposite plate. A pin 73 is provided for removable insertion thereof through a selected pair of holes. The holes are spaced from the mounting axle 43 a predetermined distance whereby, upon pivoting of the adjustment lever 58 rearwardly from the tractor 12, the pin 73 is engaged by the notch 62 to prevent further pivotal movement in that direction. A locking arm 75 is pivotally mounted between the plates 65 and provides a notched, or female, end portion 77 dimensioned to receive the male end portion 60 of the adjustment lever 58 therein to retain the adjustment lever in a position fully pivotally retracted in proximity to the body 20 of the tractor 12.

A pair of draft arms 80 are provided by the mounting assembly 32 and are individually mounted rigidly on the end portions 45 of the mounting axle 43 for simultaneous pivotal movement therewith. Each draft arm is elongated and provides a distal end portion 82 remote from the mounting axle 43 adapted pivotally to be secured on the implement portion 30, as is described more fully below.

The axle support brackets 43 each mount an articulated arm assembly 86. Each assembly provides a pair of elongated support arms 88 disposed in a substantially upright attitude and rigidly secured on a support bracket, as by welding or the like. The support arms 88 mutually mount an elongated linkage arm 90 and are secured pivotally on a proximal end portion 94 thereof. Each linkage arm 90 provides a distal end portion 96 remote from the proximal end portion thereof and adapted pivotally to be secured on the implement portion 30, as is described more fully below.

The implement portion 30 generally provides a frame 100 secured on and carried by the mounting assembly 32; a cultivating rotor 102 mounted on the frame 100; and a grid portion 104 pivotally mounted on the frame.

As can best be seen in FIGS. 1, 2, 3 and 4, the frame 100 provides a pair of elongated, upright members 110 each having a predetermined upper end portion 112 and an opposite, lower end portion 114. Each upright member has a forward aspect 117 disposed in facing relation to the tractor 12 and an opposite, rearward aspect 118 rearwardly remote therefrom. The upright members are interconnected by a transverse beam 120 of substantially cylindrical construction having opposite ends 122 rigidly secured, respectively, as by bolts, welding, or the like, on the upright members in proximity to their upper end portions 112.

The frame 100 further provides an elongated axle 125 having opposite ends 127 mounted, respectively, on the lower end portions 114 of the upright members 110 for rotation about a predetermined axis of rotation disposed transversely to the path of travel of the apparatus.

The rotor 102 provides a cylindrical shaft 130 secured on the axle 125 for rotation therewith about a common axis. The transverse beam 120 of the frame mounts a pair of hydraulic motors 132 of conventional design connected in driven relation to a source of hydraulic fluid by conventional fluid supply and return lines (not shown). The hydraulic motors 132 are each connected to a conventional power train 133 and a drive assembly (not shown) housed by the upright members 110, and the drive assembly is connected in driving relation to the axle 125 to impart powered rotation thereto. The rotation of the axle and, hence, the rotor 102 is clockwise, as viewed in FIGS. 1, 3 and 4, in the direction of arrow 135.

The rotor 102 mounts a multiplicity of teeth 140 secured on the rotor as by welding. The teeth are of flat steel plate construction or the like and are each inclined forwardly with respect to the direction of rotation of the rotor. The teeth are disposed in a double spiral about the rotor and are of substantially identical dimensions. Each tooth 140 provides a hardened tip or hammer portion 142 of reinforced or hardened steel construction or other suitable material resistant to wear. As can best be seen in FIG. 3, the hammer portions 142 are disposed substantially radially equidistantly from the shaft 130 whereby the rotor is of a substantially cylindrical configuration having a periphery defined by the hammer portions.

The frame 100 mounts a shield or deflecting shroud 146 having an elongated, arcuate portion 148 disposed substantially concentrically to and spaced from the periphery of the rotor 102 and extending transversely between the upright members 110, to which it is secured, as by welding or the like. The deflecting shroud further provides a substantially flat forward plate 149 disposed forwardly of the rotor and depending from the arcuate portion 148. A plurality of transversely spaced reinforcement members 150 interconnect the arcuate and flat portions to prevent forward deflection of the flat portion by materials impinged thereagainst.

Figure 2:
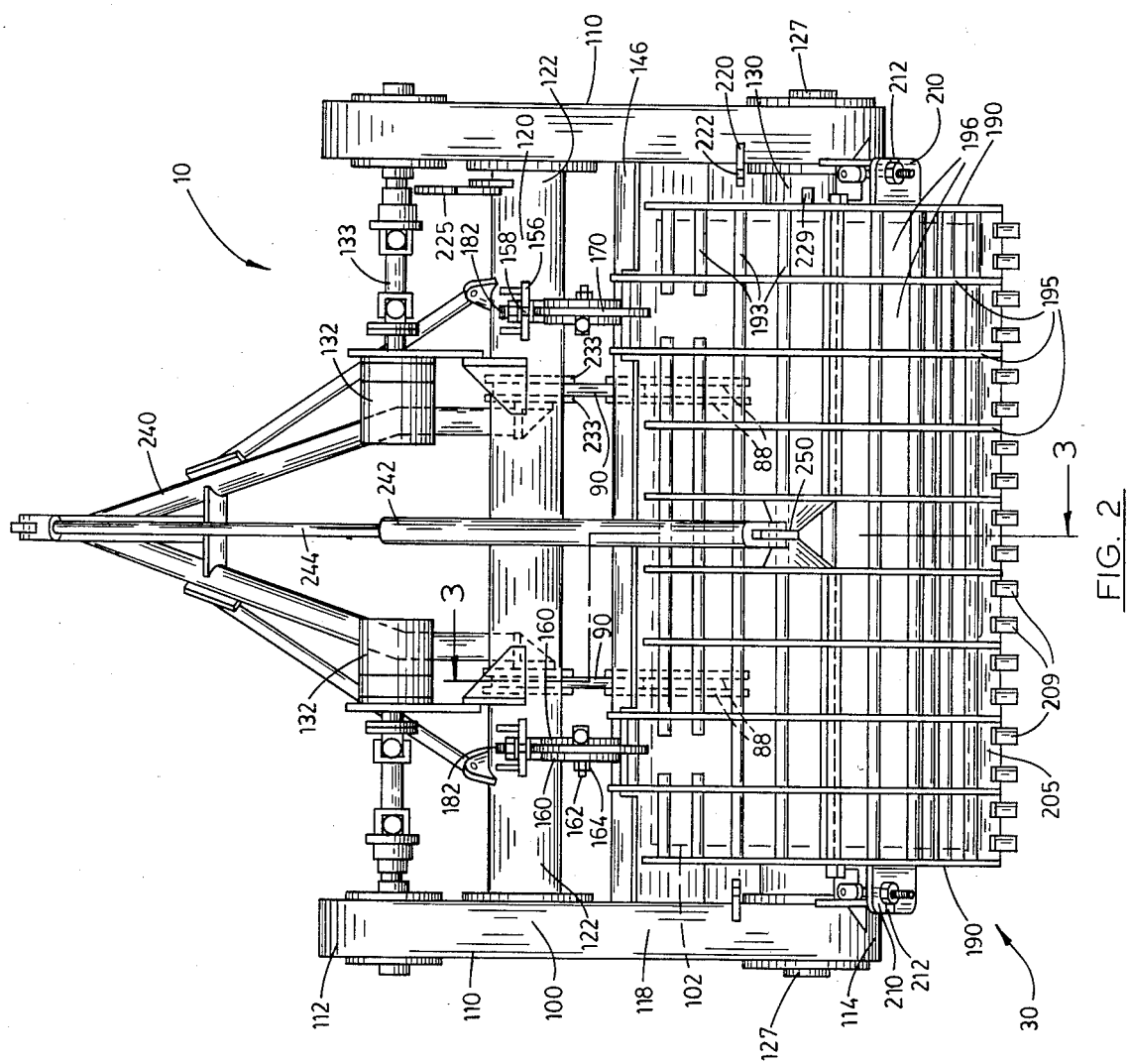
FIG. 2 is a rear elevation of the apparatus of FIG. 1 shown operatively deployed.

The transverse beam 120 mounts a pair of hinge assemblies 154, as can best be seen in FIGS. 2 and 3. Each hinge assembly provides a mounting bracket 156 having a slot 158 projecting rearwardly from the transverse beam. The hinge assemblies each further provide a pair of substantially flat hinge mounting plates 160 one of which is secured as by welding, on the transverse beam and extending rearwardly therefrom, and the other of which is initially unattached and adapted to be secured to the first plate by screw-threaded compression bolts 162 and nuts 164.

The hinge assemblies 154 also each provide an adjustment plate 170 of substantially flat, steel plate construction. Each adjustment plate provides an elongated body portion 172 having a predetermined forward end portion 174 and an opposite, rearward end portion 176. The body 172 is elongated between the forward portion 174 and rearward portion 176 to define a longitudinal dimension. The forward portion 174 mounts a longitudinal adjustment bolt 178 extending forwardly therefrom. The rearward portion 176 mounts an adjustment nut 179 secured thereon as by welding or the like and adapted screw-threadably to receive a longitudinal adjustment bolt 180 therethrough. A vertical adjustment bolt 182 is mounted on the body 172 of the adjustment plate 170 by welding or the like intermediate the forward portion 174 and rearward portion 176 and extends upwardly therefrom in a plane substantially in common with the body 172. The vertical adjustment bolt 182 is screw threaded and screw-threadably mounts a pair of vertical adjustment nuts thereon. The longitudinal adjustment bolt 178 on the forward portion 174 of the body 172 mounts a pair of longitudinal adjustment nuts 186. The body 172 provides a pair of slots 188 therethrough elongated longitudinally and spaced from each other between the forward portion 174 and the rearward portion 176.

The body 172 of the plate 170 is received between the hinge mounting plates 160 and is disposed to align the slots 188 to receive the compression bolts 162 therethrough. The vertical adjustment bolt 182 is received within the slot 158 of the mounting bracket 156. The nuts 164 of the compression bolts 162 are tightened to bias the adjustment plate 170 tightly between the hinge mounting plates 160. Similarly, the vertical adjustment nuts 184 are disposed on opposite sides of the slot 158 of the mounting bracket 156 to secure the vertical adjustment bolt 182 to the mounting bracket 156. As can best be seen in FIG. 3, the adjustment bolt 180 of the rearward portion 176 of the body 172 of the adjustment plate 170 abuts one of the hinge mounting plates 160 in a mounted attitude. Similarly, the longitudinal adjustment nuts 186 of the longitudinal adjustment bolt 178 abuts the hinge mounting plates 160 on their forward aspect. Thus, it will be seen that selective, screw-threaded movement of the longitudinal adjustment bolt 180 and the longitudinal adjustment nuts 186 permits the forward and rearward longitudinal adjustment of the adjustment plate 170. Similarly, it will be seen that selective, screw-threaded movement of the vertical adjustment nuts 184 on the vertical adjustment bolt 182 will move the adjustment plate 170 to a desired attitude of disposition nearer to or farther from the transverse beam 120 in a plane of movement substantially perpendicular to the plane of longitudinal adjustable movement effected by adjustment of the longitudinal adjustment nuts 186 and longitudinal adjustment bolt 180.

Figure 4:
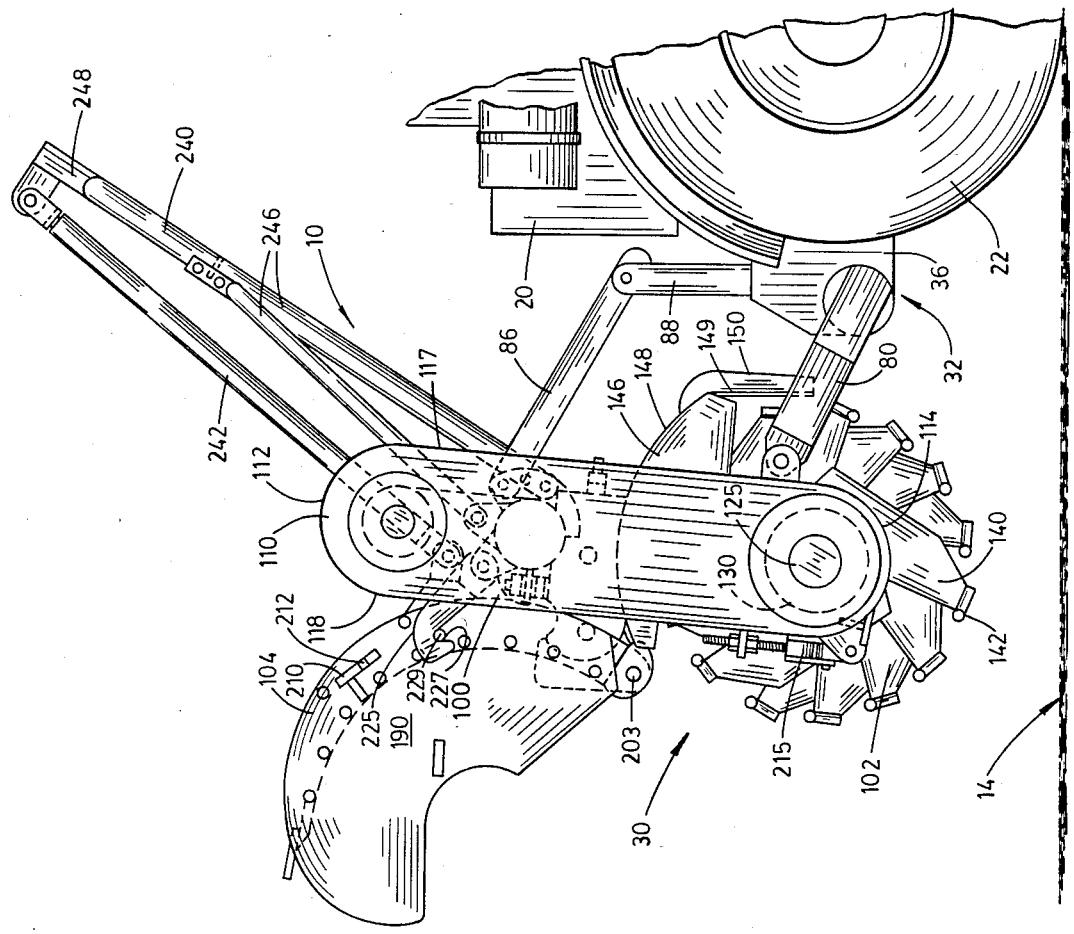
FIG. 4 is a fragmentary side elevation of the apparatus of FIG. 1 disposed in a non-operational attitude with portions thereof removed for illustrative purposes.
Figure 6:
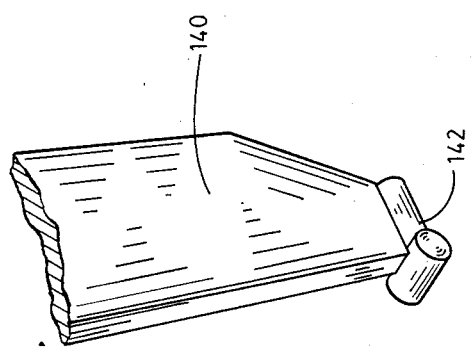
FIG. 6 is a perspective view of a tooth employed in the apparatus of the present invention.

The grid portion 104 is substantially arcuate in configuration, as viewed in FIGS. 1, 3, and 4, and is formed on a radius greater than that of the rotor 102. The grid provides a pair of end walls 190 spaced transversely of each other a distance slightly greater than the length of the rotor. The end walls are rigidly interconnected by a plurality of circumferentially spaced, transversely disposed, elongated bars or rods 193. A plurality of transversely spaced, arcuate reinforcing plates 195 are secured, as by welding, to the transverse rods 193 in interconnecting relation thereto to define and bound a multiplicity of pores or holes 196, the dimensions of which are determined by the spacing, respectively, of the transverse rods and arcuate plates. As can best be seen in FIG. 3, the arcuate reinforcing plates 195 each have a predetermined interior aspect or face 197 adapted operatively to be disposed in facing relation to the periphery of the rotor 102 and an opposite, exterior aspect or face 199 disposed distally thereof. As can best be seen in FIG. 3, the transverse rods 193 are each aligned to dispose a portion of the periphery thereof substantially tangentially to the arc of the interior face 197 of the arcuate plates 195 whereby the grid, viewed transversely, is configured having a substantially continuous interior periphery formed on a radius greater than that of the rotor 102.

As can best be seen in FIG. 2, two pairs of the arcuate plates 195 are circumferentially extended a greater distance than the remainder of such plates. The pairs so extended each mount a hinge rod 203 adapted pivotally to be secured on a portion of the adjustment plate 170 of one of the hinge assemblies 154. The hinge rods 203 are disposed substantially coaxially and are mounted by the adjustment plate 170 for pivotal movement about the substantially common axis disposed substantially in parallel relation to the transverse beam 120 and axle 125. The end walls 190 of the grid 104 each mount an outwardly projecting slotted retaining plate 210 having a transversely, outwardly disposed slot 212.

As can best be seen by reference to FIGS. 2 and 3, the grid mounts a transversely disposed, elongated strike plate or anvil portion 205 extending transversely completely between the end walls 190 and mounted circumferentially remotely from the hinge rods 203 to define a leading edge portion 206. The anvil is preferably constructed of thick, reinforced or hardened steel or other suitable material resistant to wear due to repeated impacts of hard materials thereagainst. The anvil provides a strike surface 207 disposed substantially continuous with the interior periphery of the grid and substantially tangential thereto. The surface, however, can be either substantially flat or arcuate. Further, the anvil 205 is mounted to dispose the surface 207 thereof, preferably, although not necessarily, either coextensive with the interior periphery of the grid or tangential thereto.

However, the anvil 205 can be off-set slightly and disposed on a radius slightly greater than that of the interior surface 197 of the arcuate reinforcing plates 195. As can best be seen in FIG. 2, a plurality of sturdy, rigid teeth 209 are secured as by welding or the like transversely spaced from each other along the anvil 205, each tooth projecting tangentially forwardly of the leading edge portion 206. As can best be seen in FIG. 3, the grid is dimensioned to permit disposition of the anvil 205 substantially vertically below the upright members 110 of the frame 100 when deployed in an operative attitude for pulverizing frangible materials. Also, as can best be seen in FIG. 3 and is discussed more fully below, the grid is adjustable to dispose the anvil substantially vertically below the lowermost portion of the periphery of the rotor 102 to permit the anvil 205 to urge the frangible materials engaged thereby during forward earth traversing movement of the apparatus into engagement with the hammers 142 of the teeth 140 disposed at the lowermost portion of the rotor whereby such frangible materials may be fractured by the impact of the hammers 142 thereagainst.

As can best be seen by reference to FIGS. 1, 2, 3 and 4, the upright members 110 of the frame 100 each mount an adjustable turnbuckle or retaining member 215 pivotally secured on the rearward surface 118 of the lower end portion 114 thereof. Each retaining member 215 provides a screw-threaded bolt 217 adapted to be received within the slot 212 of a retaining plate 210 and each bolt 217 mounts a pair of locking nuts 219 screw-threadably received thereon and adapted to bias opposite sides of the retaining plate 210. The retaining member 215 serves the dual purpose of retaining portions of the grid 104 distally of the hinge rods 203 in fixed, spaced relation to the rotor 102 and preventing the grid 104 from rearward displacement during the operation of the apparatus 10. Each upright member 110 also mounts a storage plate 220 on its rearward surface 118 having a slot 222 adapted to receive the bolt 217 of the retaining member 215 for storage thereof when the grid 104 is disposed in an elevated attitude, as illustrated in FIG. 4.

The transverse beam 120 pivotally mounts a retaining hook 225 having a notched portion 227 dimensioned to be received about a transversely disposed rod 229 extending transversely outwardly from an end wall 190 of the grid. The retaining hook 225 is operable to insure that the grid is retained in the elevated attitude illustrated in FIG. 4 to prevent accidental droppage thereof. The retaining hook 225 is manually or mechanically operable to disengage the notch portion 227 thereof from the transverse rod 229 to permit lowering of the grid.

The transverse beam 120 also mounts two pairs of fractionally, circumferentially extended arm mounting plates 233 spaced transversely of each other a distance substantially equal to that by which the articulated arm assemblies 86 of the mounting assemblies 32 are spaced. Each arm mounting plate provides a plurality of circumferentially spaced mounting apertures 235 individually selectively adapted to pivotally mount, by a pivot pin 237, the distal end portion 96 of the linkage arm 90 of an articulated arm assembly 86. As is described more fully below, the appropriate aperture 235 for connection of the linkage arm 90 is selected to insure that, in operation, the upright members 110 are each disposed in a substantially longitudinally vertical attitude.

The transverse beam 120 mounts means for selective raising and lowering of the grid 104 in the form of an upwardly projecting, hydraulic support assembly 240 and a hydraulic cylinder 242 having an extensible ram 244 mounted thereon. Hydraulic support assembly 240 provides a plurality of legs 246 secured on the transverse beam 120 upwardly convergent and terminating in an uppermost portion 248. The ram 244 is pivotally linked to the upper portion 248 and the hydraulic cylinder 242 is pivotally mounted substantially centrally on the grid 104. As can best be seen in FIG. 2, the hydraulic cylinder 242 is secured on a pair of arcuate reinforcing plates 195 by means of a pivotal mount 250. The hydraulic cylinder 242 is connected by conventional hydraulic supply and return lines (not shown) connected in fluidflow relation to a conventional hydraulic fluid system (also not shown) and is conventionally operable whereby the extension of the ram 244 from the hydraulic cylinder 242 will effect a lowering of the grid toward the rotor 102 and conversely retraction of the ram into the cylinder will effect pivoting of the grid about the hinge rods 203 to raise the grid away from the rotor, as can best be seen in FIG. 4.

OPERATION

Th operation of the described embodiment of the present invention is believed readily apparent and is briefly summarized at this point. Prior to use of the apparatus 10 for pulverizing aggregate masses of frangible materials disposed on and below an earth surface, it is normally necessary to transport the apparatus to the work environment. Preparatory to such transportation, the apparatus is elevated to raise the lowermost portions of the grid 104 and rotor 102 to prevent dragging thereof on roads or earth surfaces over which the apparatus 10 and tractor 12 must travel to reach the work site. The apparatus is most efficaciously and compactly transported in the attitude illustrated in FIG. 1. As shown therein, the ram 244 of the hydraulic cylinder 242 is substantially fully extended, whereby the grid is disposed in substantially shrouding relation to the rearmost portion of the rotor. The turnbuckles 215 are pivoted away from the upright members 110 to dispose the bolts 217 thereof in the slots 212 of the retaining plates 210 mounted on the end walls 190 of the grid. The nuts 219 are tightened on opposite sides of the retaining plate 210 securely to retain the bolt 217 in the slot 212 and to insure against inadvertent pivoting of the grid away from the rotor.

The ram 50 of the hydraulic cylinder 52 mounted by the body 20 of the tractor 12 is retracted to move the pivot lever 48 toward the body of the tractor, thus effecting a pivoting of the mounting axle 43 in a clockwise direction, as viewed in FIG. 1. Such pivoting of the mounting axle 43 causes a similar pivotal elevation of the draft arms 80 connected on the upright members 110 of the frame 100 of the implement portion 30. The frame 100 is consequently elevated whereby the lowermost portions of the grid and rotor are raised above the ground surface on which the tractor 12 is to ride. Simultaneously, the linkage arms 90 of the articulated arm assemblies 86 pivot upward to stabilize the upper end portions 112 of the upright members 110 to prevent the upright members from moving more than a small degree beyond the vertical in relation to the earth surface.

The ram 50 is retracted to effect an amount of pivoting of the mounting axle 43 to dispose the male end portion 60 of the adjustment lever 58 in engagement with the notch 77 of the locking arm 75 whereby the mounting axle 43 is prevented from accidentally pivoting away from the tractor 12 in the event the hydraulic ram 50 is inadvertently released and permitted to extend from the cylinder 52 causing the implement portion 30 to drop toward the earth surface. The tractor 12 is then operated conventionally to tow the implement portion to the work site.

While the apparatus 10 is largely effective in pulverizing a wide variety of frangible materials disposed on or below earth surfaces, it is to be recognized that the apparatus does not operate in the manner of a conventional ripper having one or more elongated teeth adapted to be ripped through soil to fragment cohesive masses therebelow. Rather, the apparatus enjoys its greatest effectiveness if earth surfaces and materials therebelow are ripped using conventional ripping implements prior to the pulverizing of same, whereby the work environment in which the apparatus will be used will comprise fragments or aggregate masses of varying sizes of frangible materials.

It is preferable that the apparatus 10 be utilized for pulverizing such fragments deposited on or below an earth surface 14, such as that found in an orchard between planted rows of trees or a vineyard between planted rows of vines wherein the path of travel of the tractor 12 and apparatus 10 is substantially linear.

Upon arrival at the work site, a determination must first be made as to the desired depth below the earth surface to which it is desirable to penetrate the grid and rotor to cultivate and pulverize aggregate masses of frangible materials deposited on and below the surface. Upon making such a determination, the depth gauge assembly 56 is adjusted to permit the teeth 209 and leading edge portion 206 of the anvil 205 of the grid 104 to ride at such desired depth below the earth surface. Such depth will be in relation to the substantially horizontal plane in which the wheels 22 of the tractor 12 are disposed periodically during travel along the selected path. The depth gauge assembly 56 is adjusted by removal of the pin 73 and insertion thereof through a selected pair of aligned holes 70 in the plates 65. Dependent upon the spacing of the holes 70 in each plate from one another, insertion of the pin 73 in one of the pair of adjacent holes as opposed to the other of such pair will permit the lowering of the draft arms 80 a predetermined number of degrees about the axis of rotation of the axle 43. Thus, the distance by which the distal end 82 of each draft arm 80 may descend and cause consequent penetration into the soil of the teeth 209 and leading edge portion 206 of the anvil 205 will also be in relation to the length of the draft arms. Until the desired holes 70 have been selected and pin 73 has been inserted therethrough, the notch 77 of the locking arm 75 should be left in engagement with the male end 60 of the adjustment lever 58 to prevent rearward pivoting thereof. The spacing between the periphery of the rotor 102 and the interior periphery of the grid 104 is then adjusted in accordance with anticipated volume and type of frangible materials to be encountered for pulverizing by the apparatus 10. In general, the nearer the transverse rods 193 are spaced to the periphery of the rotor 102, the greater will be the hammering effect of the teeth 140 against the aggregate masses 16 for impinging of the masses against the transverse rods and arcuate reinforcing plates 195. Further, it is desirable prior to the operation of the apparatus 10 to adjust the spacing of the surface 207 of the anvil 205 from the periphery of the rotor 102, the determination of such spacing also being primarily a function of the relative dimensions of the aggregate masses 16 anticipated to be encountered, as well as the depth of penetration of the teeth 209 and leading edge portion 206 of the anvil 205.

The rearmost portion of the arcuate interior periphery of the grid is adjusted forwardly or rearwardly toward and away from the rearmost portion of the periphery of the rotor 102 using the longitudinal adjustment nuts 186 and longitudinal adjustment bolt 180 of the adjustment plate 170. Selective turning of the adjustment bolt 180 and adjustment nuts 186 effects a forward or rearward repositioning of the plate 170 relative to the tractor 12 and consequently a similar relative forward or rearward disposition of the hinge rods 203 on which the grid 104 is mounted. Forward repositioning of the plate 170 effects a narrowing of the spacing between the grid and the rearmost portion of the rotor and rearward repositioning of the plate increases the spacing of the grid and rotor.

Elevation and lowering of the hinge rods 203 in a substantially vertical plane is accomplished by operation of the vertical adjustment nuts 184 on the vertical adjustment bolt 182. Such vertical adjustment upwardly or downwardly will necessarily also alter the spacing between the surface 207 of the anvil 205 relative to the periphery of the rotor 102 when the grid is operatively deployed in the attitude illustrated in FIGS. 1, 2 and 3. Thus, it is preferable that such adjustment be made when the grid is disposed in substantially shrouding relation to the rotor. Prior to adjustment of the vertical adjustment nuts 184, the adjustment bolts 162 and nuts 164 are loosened to permit movement of the adjustment plate 170 upwardly and downwardly between the hinge mounting plates 160. Upon adjustment of the vertical adjustment nuts 184 and vertical adjustment bolt 182, the compression bolts 162 and nuts 164 are once again tightened to secure the adjustment plate 170 in fixed relation to the transverse beam 120.

Adjustment of the adjustment plate 170 forwardly or rearwardly and upwardly or downwardly, as described immediately above, will dispose the hinge rod 203 in fixed relation relative to the rotor. The final adjustment of the grid 104 is made employing the retaining member 215. Such adjustment is made to bring portions of the grid remote from the hinge rod 203 nearer to or farther from the rotor to define a space between the hammers 142 in the periphery of the rotor and the interior periphery of the grid. With the bolt 217 disposed within the slot 212 of the retaining plate 210, the nuts 219 are screw-threadably adjusted to draw the grid toward or away from the rotor. It will be seen upon reference to FIG. 1 that tightening of the nuts 219 will not only narrow the spacing between the surface 207 of the anvil 205 and the teeth 140 nearest thereto, but also will move the leading edge portion 206 forwardly. Similarly, adjustment of the nuts outwardly on the bolt 217 will cause a relative increasing of the spacing and a rearwardly directed movement of the leading edge portion 206.

To operate the apparatus 10 for pulverizing aggregate masses 16 of material deposited on or below an earth surface 14, the tractor 12 is first operated to align the rotor 102 substantially transversely to a selected path of travel over the earth surface. The hydraulic motors 132 are then actuated to cause the axle 125 and the rotor 102 to rotate in the direction of the arrow 135 in FIG. 3. As the tractor is caused to move forwardly along the selected path of travel with the apparatus 10 towed rearwardly thereof, the axle 125 will rotate in such a manner that the teeth 140 disposed nearest the ground or earth surface 14 will move in a direction opposite that of the earth traversing movement of the tractor and apparatus. Locking arm 75 is disengaged from the male end 60 of the adjustment lever 58, and as the earth surface 14 containing the aggregate masses 16 desired to be pulverized is approached, the ram 50 of the hydraulic cylinder 52 mounted on the body 20 of the tractor 12 is extended to permit the adjustment lever 58 and the draft arms 80 to descend whereby the rotor 102 is lowered toward the earth surface 14. Continued forward motion of the tractor 12 and the apparatus 10 will then permit the teeth 209 and leading edge portion 206 of the anvil 205 obliquely to engage the earth surface 14 and penetrate therethrough. Such penetration will continue until the notch 62 of the adjustment lever 58 engages the pin 73 inserted through the holes 70, at which time further pivotal movement of the mounting axle 43 in that direction is prevented. The implement portion 30 is restrained against upward movement potentially caused by resistance of the earth surface to penetration by the leading edge portion 206 of the anvil 205 by the combined resistance provided by the linkage arms 90 against the support arms 88 and the resistance of the ram 50 of the cylinder 52 against retraction into the cylinder.

Forward movement of the leading edge portion 206 and teeth 209 of the anvil 205 causes the surface 207 of the anvil obliquely to engage and upwardly urge the aggregate masses 16 on and below the earth surface 14. As described above, it is preferable that the anvil surface 207 be deployed substantially vertically below the lowermost teeth 140 of the rotor whereby maximum force is exerted by the hammers 142 in impacting against any aggregate masses disposed between the surface 207 and the rotor. Such impacting will cause an initial fracturing or fragmenting of the masses with a resultant reduction of the average dimensions of the pieces of the aggregate masses discharged rearwardly by the rotor teeth. Rotation of the rotor accelerates the pieces rearwardly and upwardly to impinge against the grid and further fragment. Particles of dimensions sufficiently small to pass through the holes 196 defined by the transverse rods 193 and arcuate reinforcing plates 195 exit rearwardly through the grid. Particles not sufficiently reduced in size are either churned as a mass between the hammers 142 and the grid or are carried or thrown upwardly and forwardly by the rotation of the rotor. Remaining pieces are thrown forwardly of the rotor and are deposited on the earth surface 14 immediately ahead of the rotor in its path of travel for repeated engagement thereby. The arcuate portion 148 and flat portion 149 of the shield 146 direct the non-pulverized particles and the pieces not discharged through the grid downwardly and prevent the escape thereof forwardly toward the tractor.

Access to the rotor 102 for purposes of servicing it, such as the rebuilding of the hammers 142 of the teeth 140 or repairing portions thereof, is facilitated by deploying the apparatus 10 in the attitude shown in FIG. 4, wherein the grid 104 is elevated remotely upwardly from the rotor.

Elevation of the grid is accomplished by operating the hydraulic cylinder 242 to retract the ram 244. Retraction of the ram effects a pivoting of the grid 104 about the hinge rods 203 to move the grid from the first position shown in FIGS. 1, 2 and 3 to the second position shown in FIG. 4. Upon complete elevation of the grid, the transverse rod 229 will couple with the notch 227 of the retaining hook 225, whereby the grid will be retained against inadvertent downward pivotal movement.

Lowering of the grid is accomplished by the reverse of the above steps; that is, the hook 225 is manually or mechanically disengaged from the transverse rod 229 and the ram 244 is then extended from the cylinder 242.

Thus, the present invention provides an apparatus for pulverizing compacted soil and other aggregate cohesive masses, such as rock or asphalt, deposited on or below earth surfaces and which is capable of pulverizing even the hardest of such compacted masses with an efficiency and resulting homogeneity of such material heretofore believed unattainable. Further, the apparatus is adaptable for cultivating soil and the like at a variety of depths and is adjustable to permit use thereof in a variety of work environments.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. An apparatus adapted to be connected rearwardly on a powered prime mover for towing of the apparatus forwardly along a selected path of travel on an earth surface for pulverizing aggregate masses of frangible materials deposited on and below the earth surface, the apparatus comprising:
   a frame providing an elongated transverse member having spaced, opposite end portions and a pair of elongated upright members mounted on the end portions, each upright member having a predetermined upper end portion and an opposite lower end portion;
   a mounting assembly secured on the frame and adapted to be connected rearwardly on the prime mover to dispose the transverse member transversely of the path of travel of the prime mover, the mounting assembly providing means selectively operable to raise and lower the frame relative to the earth surface to dispose the lower end portion in a selected attitude spaced from the earth surface;
   a hinge assembly mounted on the frame and defining a pivotal axis disposed substantially transversely of the path of travel, the hinge assembly being selectively and independently adjustable to move the pivotal axis defined thereby forwardly and rearwardly relative to the prime mover;
   a rotor having an axle mounted by the lower end portions of the upright members for driven rotation about an axis of rotation substantially parallel to the pivotal axis, the rotor providing a multiplicity of teeth having hammer portions spaced radially from the axle to define a substantially cylindrically configured periphery having a predetermined lowermost portion disposed remotely from the upper end portions of the upright members and adapted to be brought into contact with the earth surface;
   drive means for imparting rotary motion to the rotor in a direction wherein the lowermost portion of the rotor periphery moves rearwardly relative to the prime mover; and
   a grid member having an arcuate configuration of a greater radius than that of the rotor, the grid member providing a porous portion having a plurality of substantially straight transverse rods and a plurality of substantially arcuate pieces interconnected to define and bound a multiplicity of holes, and a strike plate portion having a surface of predetermined area, the grid member being mounted on the hinge assembly for pivotal movement thereof to deploy the surface of the strike plate in an operative attitude in spaced relation to the lowermost portion of the rotor periphery with the porous portion disposed in spaced relation to portions of the rotor periphery rearward of the lowermost portion.

2. The apparatus of claim 1 wherein the grid member has a porous portion formed on a radius greater than that of the periphery of the rotor.

3. The apparatus of claim 1 wherein the surface of the strike plate is disposed substantially tangentially in relation to the porous portion.

4. The apparatus of claim 1 wherein the grid member is movable to dispose the surface of the strike plate substantially forwardly obliquely in relation to the path of travel whereby materials engaged thereby are urged upwardly toward the rotor.

5. The apparatus of claim 1 wherein the grid member is mounted on said hinge assembly borne by the frame for pivotal movement thereof toward and away from the rotor about a pivotal axis substantially parallel to the axis of rotation of the rotor.

6. The apparatus of claim 1 wherein the hinge assembly is adjustable to dispose the pivotal axis in selected spaced relation to the axis of rotation of the rotor.

7. The apparatus of claim 1 wherein the frame mounts a retaining member adapted for removable connection on the grid member and adjustable to move the grid member to dispose the strike plate in selected spaced relation to the periphery of the rotor.

8. The apparatus of claim 1 wherein the mounting assembly is selectively operable to elevate and lower the frame in a predetermined range of motion between an elevated attitude whereby the grid member and rotor are disposed above an earth surface in spaced relation thereto and a lowered attitude wherein the strike plate portion of the grid member is disposed a predetermined depth below the earth surface.

9. The apparatus of claim 1 wherein the mounting assembly provides means for limiting the range of motion of the frame.

10. The apparatus of claim 1 wherein the mounting assembly provides an axle adapted to be mounted on the prime mover for pivotal movement about a pivotal axis disposed transversely of the path of travel; means connected to the axle for imparting pivotal movement thereto; a pair of transversely spaced draft arms of predetermined length rigidly borne by the axle for pivotal movement therewith, each draft arm providing a distal end portion remote from the axle and individually secured on the lower end portion of an upright member; and a pair of transversely spaced, articulated arm assemblies each having a first arm adapted to be secured in upstanding relation on the prime mover, and a second arm pivotally mounted on the first arm and having a distal end portion pivotally secured on the frame.

11. The apparatus of claim 10 wherein the grid member is pivotally movable between a first position wherein the strike plate is elevated remotely above the rotor and a second position wherein a portion of the surface of the strike plate is disposed substantially vertically below the lowermost portion of the rotor.

12. The apparatus of claim 11 wherein the strike plate surface is disposed substantially obliquely relative to the path of travel when the grid member is disposed in the second position, whereby aggregate masses of materials engaged thereby are urged to pass upwardly into compressive contact with the lowermost portion of the rotor periphery to fragment the masses as the apparatus is towed along the path of travel, and the masses so fragmented are propelled by the rotor into impinging engagement with the porous portion to cause pieces of the material having dimensions lesser than those of the holes to be discharged therethrough.

13. The apparatus of claim 12 wherein the lower end portion of each upright member mounts a retaining member adapted detachably to be connected to the grid member when the grid member is disposed in the second position to retain the grid member in fixed spaced relation to the rotor periphery.

14. The apparatus of claim 13 wherein the retaining member is adjustable to move the grid member toward and away from the rotor periphery when the retaining member is connected to the grid member in the second position.

15. The apparatus of claim 14 wherein the transverse member mounts a locking member adapted to be removably attached on the grid member when the grid member is disposed in the first position to retain it in said position.

16. The apparatus of claim 12 wherein the mounting assembly provides a depth gauge assembly operable to limit the range of pivotal movement of the axle about the pivotal axis.

17. The apparatus of claim 16 wherein the depth gauge assembly provides a pair of substantially flat plates adapted to be secured rigidly on the frame spaced transversely of each other substantially perpendicularly of the axle, the plates each providing a plurality of apertures therethrough substantially radially equidistantly spaced from the axle and the apertures of each plate being individually paired with a corresponding aperture of the other plate; a pin member dimensioned for removable insertion through a pair of corresponding apertures; and a lever mounted by the axle for pivotal movement therewith and dimensioned to engage the pin upon pivotal movement of the axle to delimit the range of such pivotal movement.

18. The apparatus of claim 17 wherein the frame mounts grid moving means for moving the grid member between the first position and the second position.

19. The apparatus of claim 18 wherein the grid moving means includes a hydraulic support assembly mounted on the frame and a hydraulic cylinder pivotally secured on the grid member and having a ram attached on the hydraulic support assembly, the ram being selectively movable between a retracted attitude, wherein the grid member is disposed in the first position, and an extended attitude wherein the grid member is disposed in the second position.

* * * * *